US012673265B2

(12) United States Patent　　　　(10) Patent No.:　US 12,673,265 B2
Cunnington et al.　　　　　　　　　(45) Date of Patent:　　　Jul. 7, 2026

(54) COLLISION PREVENTION PRIORITIZATION FOR EXTENDED REALITY

(71) Applicant: International Business Machines Corporation, Armonk, NY (US)

(72) Inventors: Daniel Thomas Cunnington, Winchester (GB); Giacomo Giuseppe Chiarella, Eastleigh (GB); John Jesse Wood, St Albans (GB); Eunjin Chiarella, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 18/057,261

(22) Filed: Nov. 21, 2022

(65) Prior Publication Data

US 2024/0165516 A1　　May 23, 2024

(51) Int. Cl.
| | |
|---|---|
| G06T 19/20 | (2011.01) |
| A63F 13/577 | (2014.01) |
| A63F 13/60 | (2014.01) |
| G06F 3/01 | (2006.01) |
| G09B 9/00 | (2006.01) |

(52) U.S. Cl.
CPC ............ A63F 13/577 (2014.09); A63F 13/60 (2014.09); A63F 2300/643 (2013.01); A63F 2300/8082 (2013.01)

(58) Field of Classification Search
CPC ............... G06T 19/003; G06T 19/0006; G06T 2210/21; G06T 2219/2004; G06T 2215/16; G06T 7/70; G08B 21/02; G08B 21/18; G08B 6/00; A63F 13/577; A63F 13/60; A63F 2300/8082; G06F 3/011
See application file for complete search history.

(56) References Cited

U.S. PATENT DOCUMENTS

| | | | |
|---|---|---|---|
| 10,664,988 B2 | 5/2020 | Chilcote-Bacco | |
| 10,901,215 B1 * | 1/2021 | Newcombe ........ | G02B 27/0172 |
| 10,981,060 B1 * | 4/2021 | Muskin .................. | A63F 13/25 |
| 11,158,126 B1 * | 10/2021 | Petrov ............... | G02B 27/0093 |
| 2018/0276891 A1 | 9/2018 | Craner | |
| 2019/0329136 A1 * | 10/2019 | Koyama ................ | A63F 13/55 |

(Continued)

FOREIGN PATENT DOCUMENTS

| | | |
|---|---|---|
| CN | 109564473 A | 4/2019 |

OTHER PUBLICATIONS

"How do common virtual reality tracking systems work?", Mechatech 2021, 4 pages, <https://www.mechatech.co.uk/journal/how-do-common-virtual-reality-tracking-systems-work>.

(Continued)

*Primary Examiner* — Lawrence S Galka
(74) *Attorney, Agent, or Firm* — Scott Dobson

(57) ABSTRACT

A method and system for collision prevention in an extended reality environment, the method comprising: identifying a potential collision area for multiple users, wherein each of the multiple users have respective immersive experiences; prioritizing the multiple users' immersive experiences; calculating an adaptation needed to be made to prevent a collision, based on the prioritization; and adapting at least one of the multiple users' immersive experiences, based on the calculated adaptation, such that the collision is prevented.

18 Claims, 5 Drawing Sheets

100a

(56)                 References Cited

U.S. PATENT DOCUMENTS

| | | | | |
|---|---|---|---|---|
| 2020/0103521 A1* | 4/2020 | Chiarella | ................ | H04W 4/80 |
| 2020/0329229 A1* | 10/2020 | Chen | ......................... | G06T 7/74 |
| 2020/0363639 A1 | 11/2020 | Lai | | |
| 2022/0343615 A1* | 10/2022 | Tal | .......................... | G06F 3/016 |
| 2023/0252686 A1* | 8/2023 | LeCesne | ................ | G06V 20/20 |
| 2023/0306689 A1* | 9/2023 | Zavesky | ................... | G06T 7/70 |

OTHER PUBLICATIONS

"Metro drivers get first look at new trains through virtual reality", Nexus, Dec. 29, 2020, © 2022 Nexus Tyne and Wear, 2 pages.
"Syncing multiple virtual reality headsets VR Sync", © 2018 VR Owl, 3 pages, <https://vr-sync.com/syncing-multiple-virtual-reality-headsets/>.
"VR Collaboration Platform", Copyright FutureVisual 2022, 9 pages, <https://www.futurevisual.com/visionxr/>.
Disclosed Anonymously, "A System for Optimizing Space Utilization in Virtual Reality Arenas", An IP.com Prior Art Database Technical Disclosure, IP.com No. IPCOM000243916D, IP.com Electronic Publication Date: Oct. 28, 2015, 6 pages.
Hoppe et al., "Capability for Collision Avoidance of Different User Avatars in Virtual Reality", printed on Sep. 13, 2022, 8 pages, <https://cvhci.anthropomatik.kit.edu/download/publications/HCII%2018_Capability%20for%20Collision%20Avoidan.pdf>.
James, Paul, "'Neos Core' Enables a World of Multi-User, Multi-device VR Collaboration", Feb. 23, 2016, 5 pages, <https://www.roadtovr.com/neos-core-enables-a-world-of-multi-user-multi-device-vr-collaboration/>.
Langbehn et al., "Shadow-Avatars: A Visualization Method to Avoid Collisions of Physically Co-Located Users in Room-Scale VR", printed on Sep. 13, 2022, 4 pages, <https://wevr.adalsimeone.me/2018/WEVR2018_Langbehn.pdf>.
Podkosova, Iana, "Walkable Multi-User VR The Effects of Physical and Virtual Colocation", PhD Thesis, Vienna, Dec. 1, 2018, 168 pages.
Scavarelli et al., "VR Collide! Comparing Collision-Avoidance Methods Between Co-located Virtual Reality Users", CHI EA '17: Proceedings of the 2017 CHI Conference Extended Abstracts on Human Factors in Computing Systems, May 2017, 5 pages.

* cited by examiner

260

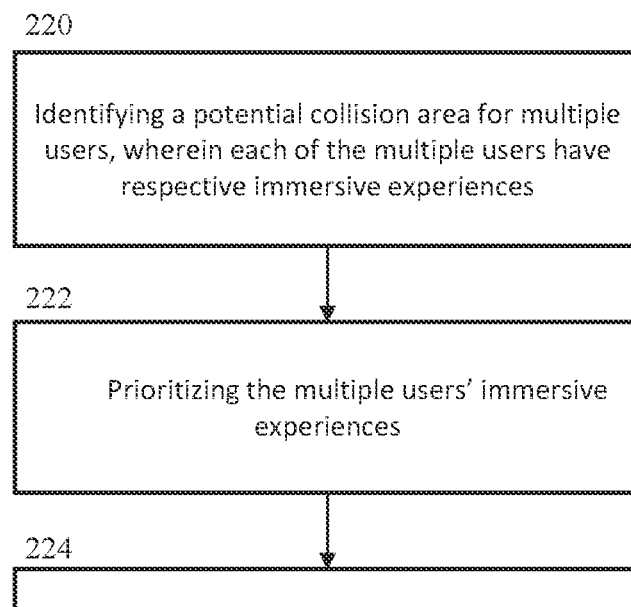

220

Identifying a potential collision area for multiple users, wherein each of the multiple users have respective immersive experiences

222

Prioritizing the multiple users' immersive experiences

224

Calculating an adaptation needed to be made to prevent a collision, based on the prioritization;

226

Adapting at least one of the multiple users' immersive experiences, based on the calculated adaptation, such that the collision is prevented

Central Server 306     308

310     312

User A's
XR system

User B's
XR system 302     304

350b

User A's XR system
314

318     320

User B's XR system
316

1100

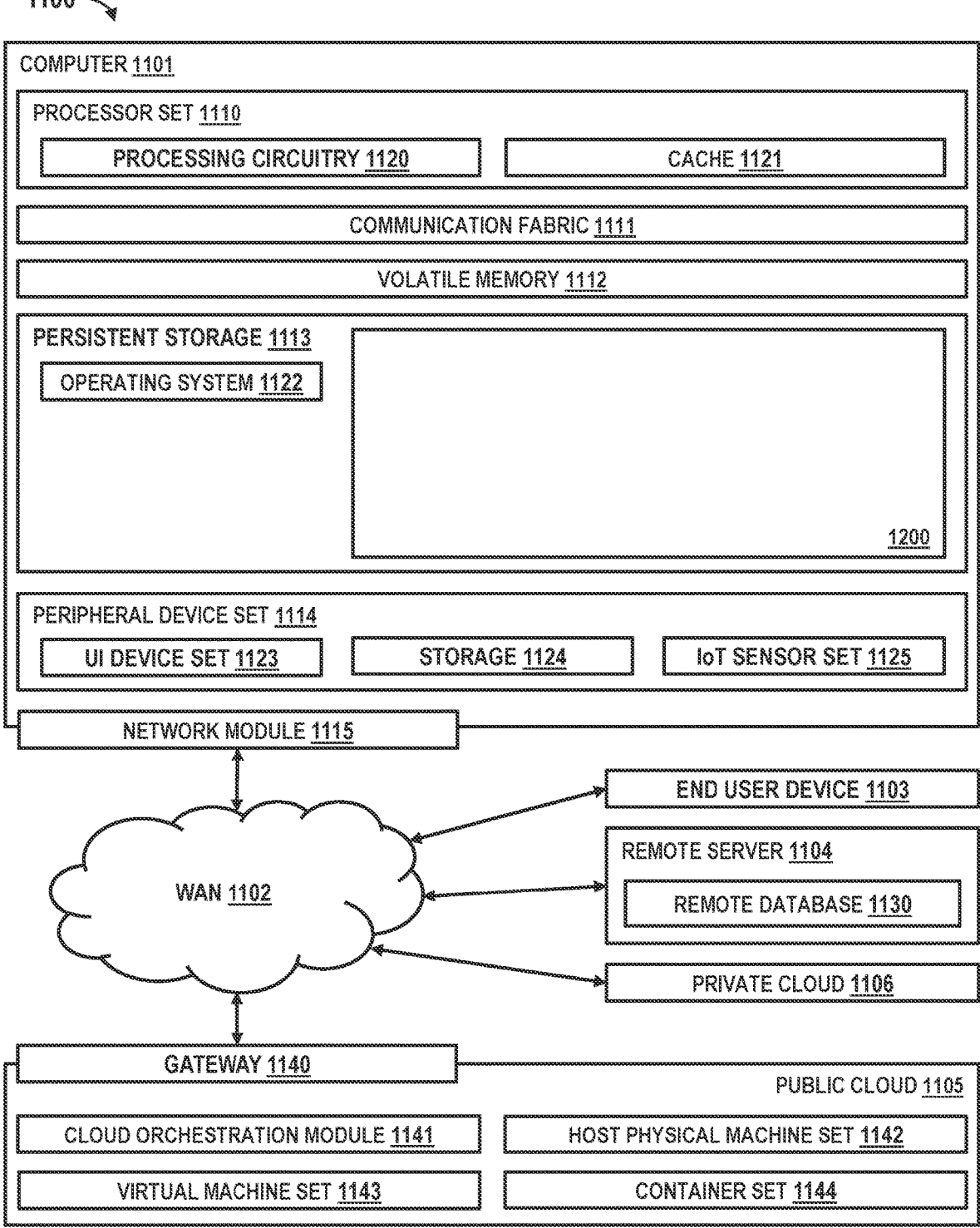

COMPUTER 1101

PROCESSOR SET 1110

PROCESSING CIRCUITRY 1120          CACHE 1121

COMMUNICATION FABRIC 1111

VOLATILE MEMORY 1112

PERSISTENT STORAGE 1113

OPERATING SYSTEM 1122

1200

PERIPHERAL DEVICE SET 1114

UI DEVICE SET 1123          STORAGE 1124          IoT SENSOR SET 1125

NETWORK MODULE 1115

END USER DEVICE 1103

REMOTE SERVER 1104

REMOTE DATABASE 1130

WAN 1102

PRIVATE CLOUD 1106

GATEWAY 1140

PUBLIC CLOUD 1105

CLOUD ORCHESTRATION MODULE 1141          HOST PHYSICAL MACHINE SET 1142

VIRTUAL MACHINE SET 1143          CONTAINER SET 1144

*FIG. 4*

COLLISION PREVENTION PRIORITIZATION FOR EXTENDED REALITY

BACKGROUND

The present invention relates to generally to extended reality technologies, and more specifically to collision prevention prioritization for immersive experiences.

Extended reality (XR) technology is a term that includes technologies that provide immersive experiences by merging the physical and virtual worlds. XR alters or enhances audio, visual and haptic interactions with the blended physical and virtual world, such that an immersive experience is created for a user. The term XR includes virtual reality (VR), augmented reality (AR) and mixed reality (MR). The different types of XR have varying levels of physical and virtual mixing.

VR is typically provided through a headset that the user wears. The headset encompasses a user's whole field of vision and provides audio through headphones. This means that the user gets a fully enclosed, synthetic experience that makes the user feel like he or she is detached from the physical world. Using cameras and sensors, users can move around the physical space he or she is in, and the movement corresponds to a movement in the corresponding virtual environment.

In AR, virtual objects and information are overlaid on the real world. For example, virtual arrows can be placed onto a real view of a street to help users with navigation. In another example, virtual colors and furniture can be placed onto a real room, to help users with interior design. Users can use AR using AR glasses, AR visors, smartphones and tablets. Users are not completely isolated from the physical world as they are with VR, but the immersive AR experience can distract users from being alert in their physical surroundings.

MR, also known as Hybrid Reality, is an enhanced form of AR. MR brings in virtual objects into the physical world like AR, as well as allowing the user to interact the virtual objects. For example, a user can wear a XR headset and use this to project a virtual keyboard in an area in front of them. The cameras in the XR headset analyses where the user is interacting with the virtual keyboard and converts the interaction into an input to a system.

SUMMARY

According to an aspect of the present invention, there is provided a method for collision prevention in an extended reality environment, the method comprising: identifying a potential collision area for multiple users, wherein each of the multiple users have respective immersive experiences; prioritizing the multiple users' immersive experiences; calculating an adaptation needed to be made to prevent a collision, based on the prioritization; and adapting at least one of the multiple users' immersive experiences, based on the calculated adaptation, such that the collision is prevented.

According to some embodiments of the present invention, adapting at least one of the multiple users' immersive experiences based upon prioritizing the multiple users' ensures that a potential collision is prevented, while each of the multiple users' experiences are not disrupted. The prioritization step calculates which user requires full access to their physical and virtual space, and at least one adaptation is made accordingly. This is an improvement to conventional methods, which place adaptations onto all users without taking into account respective virtual statuses.

Some embodiments of the present invention provide a method further comprising: analyzing each of the multiple users' ability factors such that the adaptation can be calculated, wherein the ability factor includes at least one factor from the group comprising: a reaction time, a mobility capability and an experience level.

Some embodiments of the present invention take into account users' abilities to ensure that an adaptation is made that will result in preventing a potential collision. Different users have different abilities with respect to how quickly they can react to an adaptation. For example, if an object is placed into a user's environment to prevent the user from colliding into another user and the user has a slow reaction time, the user may still move into the potential collision area and therefore a collision may still occur. Conventional collision prevention methods do not take into account users' abilities when making adaptations.

Some embodiments of the present invention provide a method further comprising: monitoring a physical location for each of the multiple users; and monitoring a virtual status of each of the multiple users, such that the multiple users' immersive experiences can be prioritized.

Some embodiments of the present invention provide a method further comprising: monitoring an upcoming trajectory for each of the multiple users, to calculate upcoming physical locations of each of the multiple users, such that the potential collision area can be identified.

Some embodiments of the present invention provide a method further comprising: analyzing virtual environments of the multiple users, to calculate overlapping physical locations of the multiple users, such that the potential collision area can be identified.

Some embodiments of the present invention provide a method wherein the prioritizing includes at least one factor related to the immersive experience selected from the group comprising: an intensity factor, a significance factor and a state factor.

Some embodiments of the present invention provide a method wherein the adapting at least one of the multiple users' immersive experiences is processed by a central server that is connected to each of the multiple users' systems that provide the immersive experience.

Some embodiments of the present invention provide a method wherein the adapting at least one of the multiple users' immersive experiences is processed by the system of a user of the multiple users' that provide the immersive experience for the user.

According to an aspect of the present invention, there is provided a system for collision prevention in an extended reality environment, the system comprising: a processing device; and a memory coupled to the processing device and storing instructions that, when executed by the processing device, cause the system to perform operations comprising: identifying a potential collision area for multiple users, wherein each of the multiple users have respective immersive experiences; prioritizing the multiple users' immersive experiences; calculating an adaptation needed to be made to prevent a collision, based on the prioritization; and adapting at least one of the multiple users' immersive experiences, based on the calculated adaptation, such that the collision is prevented.

BRIEF DESCRIPTION OF THE DRAWINGS

FIG. 2B is a flow diagram showing of the method according to an aspect of the present invention;

FIG. 4 is a block diagram depicting components of a system according to an aspect of the present invention.

DETAILED DESCRIPTION

XR has typically been adopted by several industries to provide training, entertainment, and vocational support. For example, XR has been used in the healthcare sector to provide immersive educational programs for doctors, and in the retail industry to enhance shopping experience for users. XR can also be used in conjunction with remote hardware.

XR has been extensively used in the gaming industry. The immersive experience that XR provides allows users to interact with a game in an engaging way. While engaging with XR games, it is often easy for users not to be aware of their surrounding space. This is particularly a problem for VR games because their whole field of vision and their audio senses are encompassed by the immersive experience.

Accordingly, XR experiences can lead to problems. For example, a user can accidently walk into a physical object (such as a wall or a table) because the user's virtual environment did not have a corresponding limitation. The virtual environment allowed the user to move into that area, for example, if the virtual environment is an open, unlimited field.

This is especially important when there are multiple users using XR, that are sharing the same physical space. Current XR systems allow multiple users to share a physical space. If the multiple users are in their own XR experience, and therefore, focusing on their own virtual worlds, they may collide into each other.

Current methods to solve this problem include using cameras and sensors to detect potential collision areas. Once the potential collision areas are detected, the method can alert the users of the potential collision area. This disrupts the immersive experience of the users and distracts them from experience. It also requires additional hardware to detect the potential collision area, which increases cost and processing power of the system.

In addition, current methods place a virtual object in the virtual environment to prevent a user from moving into the collision area. For example, in a video game immersive experience, a user is exploring tunnels. A rock can be placed in the entrance of a tunnel, to prevent the user from moving into the area. This allows the users to continue their experience without disrupting their video game experience.

Current methods do not prioritize the multiple users' immersive experiences to calculate an optimum adaptation. For example, one user may be in a critical stage in a game, where the user needs to access the entirety of his or her virtual space. Adapting the user's virtual environment, such as placing a rock in the virtual environment to prevent the collision will seriously disrupt the user's experience.

Current methods also do not consider the individual users' physical abilities to calculate an optimum adaptation. Different users have different levels of mobility and reaction times. These factors can influence how and when the users' immersive experiences should be adapted in order to prevent collisions.

Figure 1A:
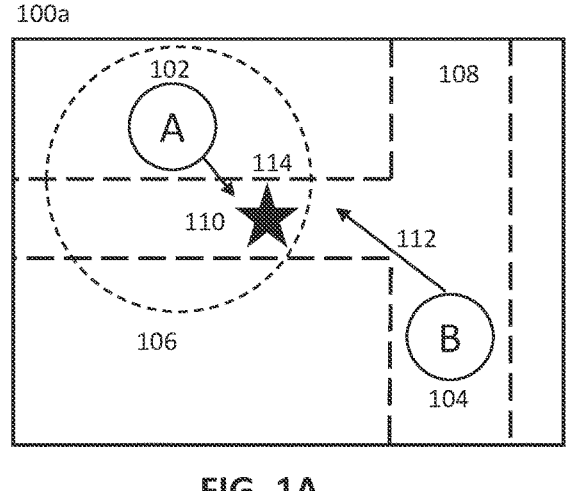
FIG. 1A is a first environment diagram showing a first aspect of how a collision is prevented for two users who share the same physical space.

FIG. 1A shows an example scenario where a physical space 100a is shared by two users—user A 102 and user B 104. User A and user B are each in their immersive experiences, facilitated by XR technology. User A is in a virtual environment 106 that allows them to move within a circular area. For example, user A may be in a virtual room that is circular, to perform a virtual surgery. User B is in a virtual environment 108 that allows the user to move within the paths shown. For example, user B may be in a game where the user is exploring tunnels.

In FIG. 1A, both users are able to move freely within the boundaries of their virtual environments. They are sharing the same physical space 100 and their virtual environments 106, 108 are overlapping. This means that potentially, they could collide into each other. This is especially true if they are both in VR immersive experiences because their vision and hearing are encompassed by the VR headset. This is also true of both users are in AR immersive experiences, because the experience may require them to go into a physical space that the other user is in, even if they can see the other user.

The method of some embodiments of the present invention monitors a current physical location and a virtual status of the immersive experience of each user. The method identifies a potential collision area for the multiple users A and B.

One way to identify the potential collision area is by monitoring an upcoming trajectory for each user, to calculate upcoming physical locations for each user, as shown in FIG. 1A. A vector 110 shows the upcoming trajectory of user A. A vector 112 shows the upcoming trajectory of user B. The method calculates that there is a potential collision area at 114. The potential collision area 114 will need to be prevented by the method. Methods to calculate the vectors and upcoming trajectories are known in the art. For example, the vectors can be calculated using the position of the headset in relation to the VR system or by using external cameras that monitor the position of the users' headsets. Upcoming trajectories can be calculated by extrapolating the vectors and combining it with the users' real-time movement information.

Figure 1B:
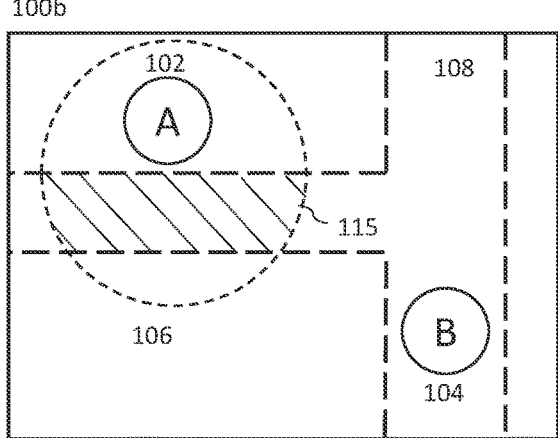
FIG. 1B is a second environment diagram showing a second aspect of how a collision is prevented for two users who share the same physical space.

Another method to calculate the potential collision area is to analyze each other users' virtual environments to calculate overlapping physical locations of the multiple users, as shown in environment 100b of FIG. 1B. The overlap is calculated by known methods, for example, by combining the maximum area that the users can move in, to determine the overlapping areas. The method calculates that the area 115 of the physical environment overlaps for the two users. The potential collision area 115 will need to be prevented by the method.

The potential collision area identification method described in FIG. 1A and FIG. 1B can be used together. For example, the potential collision area 115 can first be calculated, and then the upcoming trajectories used to calculate a more specific potential collision area. A person skilled in the art will appreciate that there are other ways of calculating the potential collision area, including using sensors and cameras to track the users' movements. The upcoming potential collision area calculation can be accompanied by a calculation of the time of an upcoming collision. A person skilled in the art will appreciate that the methods used to calculate the potential collision areas can be done other methods known in the art.

Figure 1C:
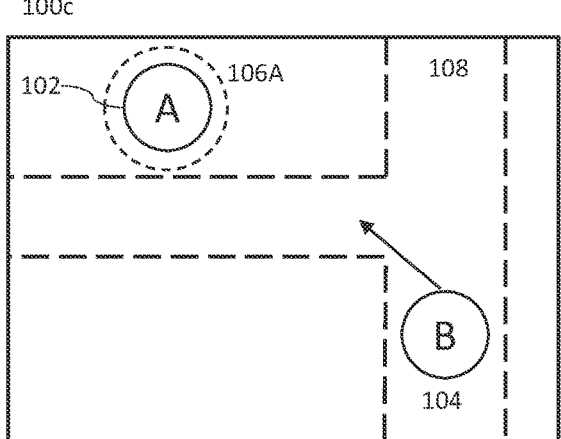
FIG. 1C is a third environment diagram showing a third aspect of how a collision is prevented for two users who share the same physical space.

Once the potential collision area has been identified, the method prioritizes the multiple users' immersive experiences, to calculate which user's immersive experience should be given priority. The prioritization considers the users' abilities and their current state of their immersive experience, which is discussed in more detail below. FIG. 1C shows (in environment 100c) the example where user B is given priority; user B's immersive experience has been calculated to be more important than user A's immersive experience. Therefore, the method calculates an adaptation needed to prevent the collision, as well as allowing user B to access the whole of their virtual environment 108.

For example, the adaptation needed to prevent the collision is for user A's virtual environment to reduce, such that user A will not collide into user B. The method sends an instruction to user A's XR system (for example, a headset), to reduce user A's virtual environment. User A's XR system implements the instruction so the collision is prevented. User A's virtual environment is reduced 106A to prevent the collision. The instruction includes an appropriate adaptation to make to user A's experience such that their immersive experience is not disrupted, for example, by changing user A's scene into a video, such that user A does not need to move around at all. The different types of adaptations are discussed further below.

Figure 1D:
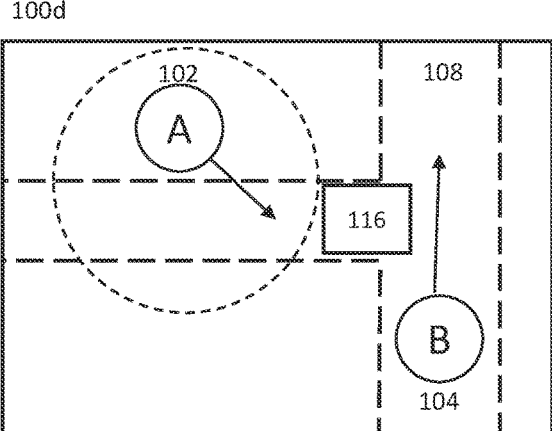
FIG. 1D is a fourth environment diagram showing a fourth aspect of how a collision is prevented for two users who share the same physical space.

FIG. 1D shows (in environment 100d) an example where user A is given priority; user A's immersive experience was calculated to be more important than user B's immersive experience. Therefore, the method calculates an adaptation needed to prevent the collision, as well as allowing user A to access the whole of their virtual environment. For example, the adaptation needed to prevent the collision is to place an object 116 in user B's virtual environment, such that user B is prevented from moving into user A's area. The method sends an instruction to user B's XR system, to carry out the adaptation required to prevent the collision. As discussed in earlier in this document, placing an object into a user's environment' may be disruptive and therefore this adaptation is only implemented when it is appropriate to do so. For example, it is appropriate to implement this adaptation if the object can be placed in an area that is not important to a game, or if there is no better alternative adaptation that can be made to the user's experience. The different types of adaptations are discussed further below.

Figure 2A:
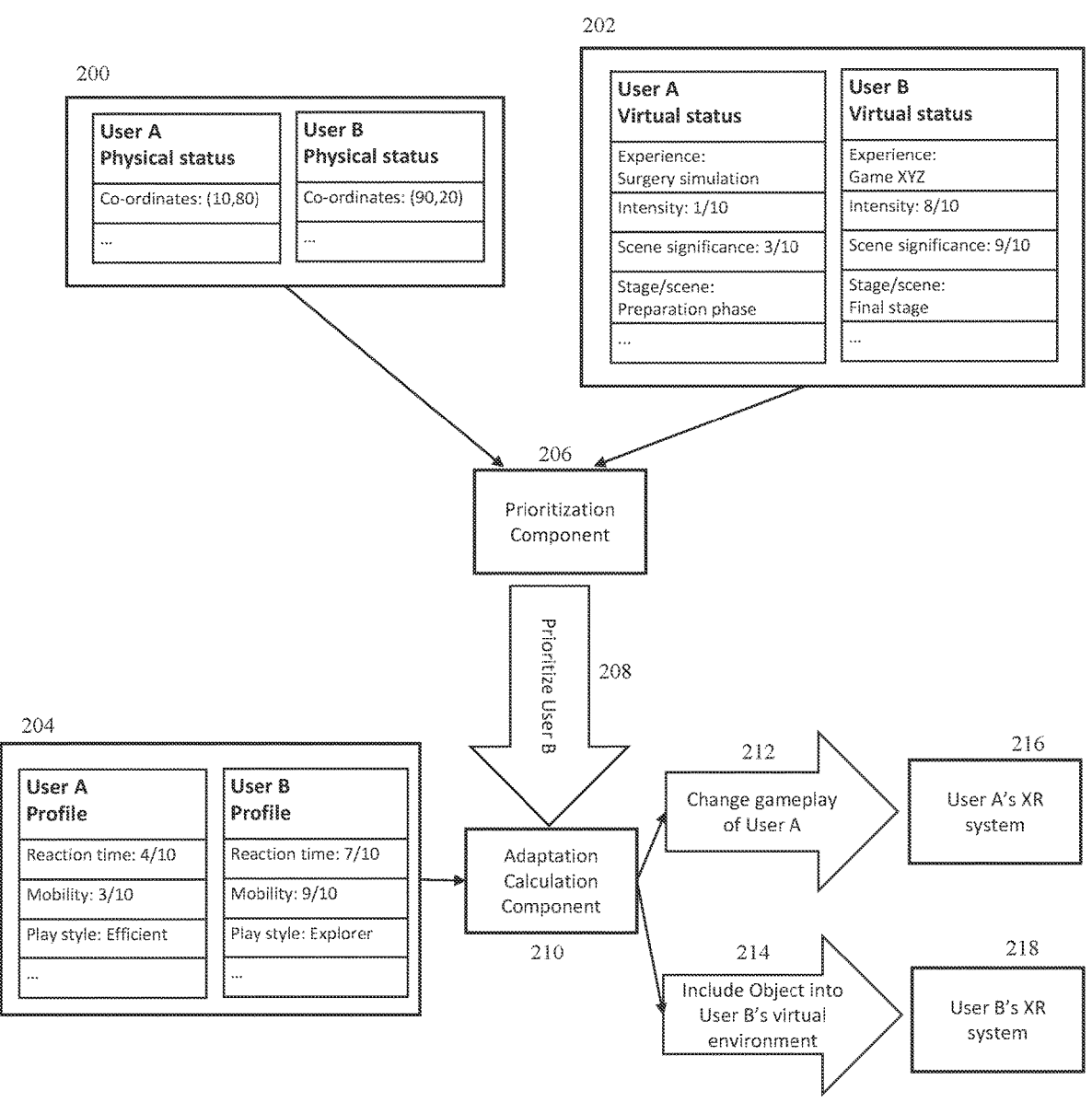
FIG. 2A is a flow diagram showing of the prioritization component and the adaptation calculation component according to an aspect of the present invention.

Flow diagram 250 of FIG. 2A illustrates an example flow of how a collision is prevented for two users. A system continually monitors each of the multiple users' physical status 200 and virtual status 202.

A user's physical status includes their real-time coordinates within the physical space. A user's virtual status includes the real-time information about the user's immersive experience. For example, the virtual status may include the type and name of the current immersive experience, the intensity of the current experience, the significance of the scene and what stage the user is going through.

A prioritization component 206 takes the profile, physical and virtual status data to prioritize a user's experience over another user's experience. In the example shown in FIG. 2A, user A is in an educational virtual surgery simulation, where the current intensity of the experience is $\frac{1}{10}$, the scene significance is $\frac{3}{10}$ and they are in a preparation stage for the surgery. User B is playing a game which the current intensity is $\frac{8}{10}$, the scene significance is $\frac{9}{10}$ and they are in a final stage of the video game level. The final stage is an extremely important stage of a game, where a user must overcome a difficult challenge in order to finish the game or progress to the next level. Therefore, changing the environment or the game of a user that is in the final stage would be extremely disruptive.

Adapting user A's experience would be less disruptive to user A's immersive experience compared to adapting user B's experience. Since user A is in a preparation stage of the immersive experience where the intensity and significance is low, adapting the immersive experience with an appropriate adaptation will not impact user A's immersive experience.

In contrast, user B's immersive experience is in the final stage scene, where the intensity and scene significance are high. This means that this scene is important to user B's immersive experience and adapting the experience at this time can severely disrupt the immersive experience. By comparing these factors, prioritization component 206 calculates that user B's immersive experience should be prioritized. The prioritization component 206 sends an instruction 208 to the adaptation calculation component 210, to calculate an adaptation to prevent a collision and to prioritize user B. If user A's was experience was a real surgery instead of an educational simulation, user A's virtual status 202 would reflect the significance of the immersive experience and may adapt user B's experience instead.

Adaptations can last for different amounts of time, depending on how much time the prioritized user requires to access the potential collision area. The method can use historical data along with the user's profile 204 to determine how long the adaptation should last for. Some embodiments of the present invention calculate how long user B's final stage scene will take by looking up how long other players took to complete this same final stage as well as user B's ability in the game. For example, it may take the average user five (5) minutes to complete this stage, and if user B's ability in the game has been better than the average player, then this ability will be reflected in the user's profile. Therefore, the method will calculate that user B will require three (3) minutes to finish the boss fight stage. The method therefore selects an adaptation that is at least three (3) minutes long for user A's experience. Ideally, the adaptation will adapt the immersive experience such that the user does not notice that the immersive experience has been adapted.

A simple adaptation of the immersive experience to prevent a collision is to alert at least one user that there is an upcoming collision and pausing the experience. This disrupts the immersive experience and distracts the user from the immersive experience.

In some embodiments, a type of adaptation includes changing the user's immersive experience mode. The mode refers to changing how the user can interact with the immersive experience. This can involve changing the stage or scene of the immersive experience. For example, in a virtual surgery setting, there can be an introductory video stage, a preparation simulation stage where the user can practice using their virtual tools, a surgery simulation stage and a summary report stage. The preparation simulation and surgery simulation stages may require the user to access a wider virtual environment compared to the introductory video stage or the summary report stage. If a user needs to stop moving for a while, for example, the transition of user A from FIG. 1A to FIG. 1C, the mode can be changed to a stage that doesn't require movement. If the immersive experience is a game, the different modes can include cinematic cut scenes, interactive gaming stages and static gaming stages.

In some embodiments, a type of adaptation includes changing the virtual environment. For example, a fog may be introduced with reduced visibility, to slow down a user. Alternatively, or in addition, the user's abilities in the immersive experience can be adapted. For example, the speed of a player can be reduced so they can no longer run.

In some embodiments, a type of adaptation includes adding a virtual object into the virtual environment, to prevent a user from moving into a potential collision area. For example, in a video game, if the user is moving through tunnels (such as in FIGS. 1A through 1D), placing a rock in one of the tunnels would prevent the user from going down the tunnel. The object can have different levels of repelling the user. For example, a user may go near a rock (in the virtual setting) placed in front of a tunnel. However, the user might be more repelled by a fire placed in front of a tunnel (in the virtual setting) because the user's virtual health in the game may be reduced, so the user might actively move around the fire. A repellant factor of virtual objects can be incorporated into the calculation of the most suitable adaptation for all users.

Alternatively, a non-player character (NPC) can be come up to the user and start interacting with the user. This may prevent the user from moving for a while.

It will be appreciated that there may be more than two users sharing a physical space. This can mean that more than one user's experience may need to be prioritized. For example, two out of four users may be in an important stage in a game, and therefore the non-prioritized users' experiences will get adapted. It will also be appreciated that all the examples described thus far have only adapted the non-prioritized users' experiences, such that the prioritized user can access the whole of their physical and virtual space. In some situations, both the non-prioritized users' and prioritized users' experiences can get adapted. For example, the prioritized user may not be in an critically important stage, such that their experience is able to be adapted as well.

The adaptation calculation component 210 gets references each of the users' profiles 204 to determine an appropriate adaptation that would prevent the collision. A user's profile includes information relating to ability (for example, a user's reaction time and mobility). The reaction time may indicate how quickly the user is able to react to a new instruction or change in environment. The mobility may indicate the physical ability of the user. The mobility can be associated to the user's general speed of movement, and maximum movement speed.

The play style reflects the how the user likes to interact with the immersive experience, which is important when calculating how long the adaptation should be. For example, a user's play style can be rated as "Efficient", which means that the user usually takes the most optimal route to the next stage without doing side activities. In contrast, if a user's play style is rated as "Explorer", this indicates that the user likes to explore the immersive world by moving freely within the space and interacting with many elements in the experience. A user who is rated as an "Explorer" may take more time finishing a stage in the experience than a user who is rated as "Efficient". Therefore, if a user's experience is prioritized and the user is rated as an "Explorer," then embodiments of the present invention chooses a longer adaptation for the other users' to accommodate for the prioritized user's play style, since they will most likely take longer to finish the experience that is prioritized.

The ability and profile of the users is considered when calculating an adaptation to prevent a collision to ensure that the adaptation is suitable for the user. An unsuitable adaptation may fail to prevent a collision. For example, if a user has a fast reaction time, the adaptation can change factors of the user's environment or the gameplay at a time closer to when of the upcoming potential collision would occur, without it disrupting the user's immersive experience. In contrast, if a user has a slow reaction time, the user may not be able to react to an adaptation in the user's virtual environment in time to prevent the collision, which would disrupt the immersive experience. Therefore, another adaptation may need to be considered to better suit the user.

In some embodiments, once adaptation calculation component 210 calculates the suitable adaptation required to prevent a collision, component 210 sends instructions 212 and 214 to one or all of the users' XR systems 216 and/or 218. In some embodiments, the XR system of the user processes the instruction to prevent the collision.

Flowchart 260 of FIG. 2B shows an example flow chart of a method according to an embodiment of the present invention. The method comprises identifying a potential collision area for multiple users, wherein each of the multiple users have respective immersive experiences 220; prioritizing the multiple users' immersive experiences 222; calculating an adaptation needed to be made to prevent a collision, based on the prioritization 224; and adapting at least one of the multiple users' immersive experiences, based on the calculated adaptation, such that the collision is prevented 226.

Figure 3A:
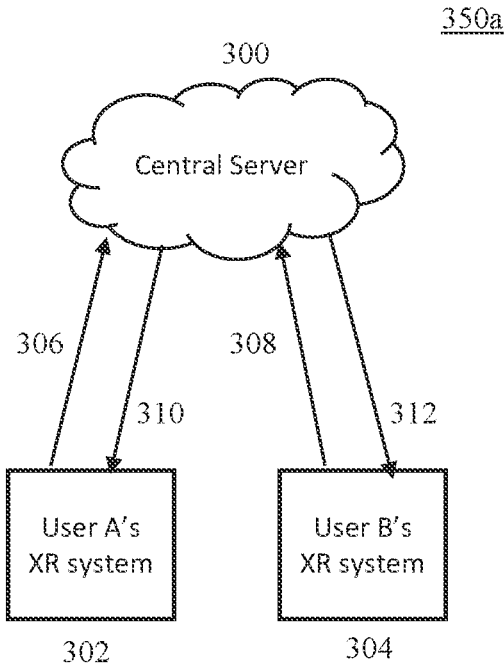
FIG. 3A is a first flow diagram showing how the method of an embodiment of the present invention can be implemented.

Embodiments of the present invention provide multiple ways for the method of flowchart 260 to be implemented. Environment 350a of FIG. 3A shows an example of a central server 300, where central server 300 can have a prioritization component (such as prioritization component 206) and an adaptation component (such as adaptation calculation component 210). The XR system of user A 302 and the XR system of user B 304 continually sends data 306 and data 308 to central server 300. In some embodiments, data 306 and data 308 includes the physical locations, virtual statuses, and profiles of users. The prioritization component and adaptation calculation component (such as adaptation calculation component 210) in central server 300 prioritizes the immersive experiences of the users and calculates the adaptations required to prevent a collision. The central server sends instructions 310 and instructions 312, associated with the calculated adaptation to the users' XR systems (302 and 304). The users' XR systems 302 and 304 process the instructions to prevent the collision.

Figure 3B:
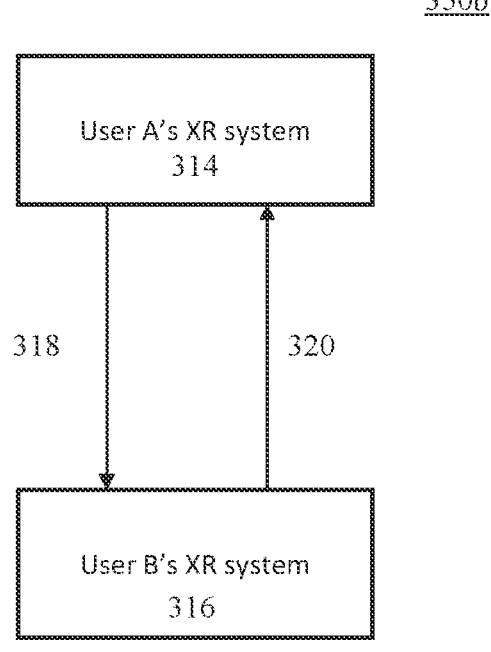
FIG. 3B is a second flow diagram showing how the method of an embodiment of the present invention can be implemented.

Alternatively, in some embodiments, one of the multiple XR systems of the multiple users can calculate the adaptations required to prevent a collision. Environment 350b of FIG. 3B does not include a central server. User A's XR system 314 continually sends information (instructions 318) to user B's XR system. User B's XR system 316 includes a prioritization component (such as prioritization component 206) and an adaptation calculation component (such as adaptation calculation component 210) to calculate the adaptations required to prevent a collision. Depending on the priority of the users, user B's XR system may send an instruction (such as instructions 320) to user A's XR system to adapt user A's immersive experience to prevent the collision. Alternatively, in some embodiments, user B's XR system 316 adapts its own immersive experience to prevent the collision.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1100 contains an example of an environment for the execution of at least some of the computer code involved in performing the inventive methods, such as preventing a collision in an extended reality environment 1200. In addition to block 1200, computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1200, as identified above), peripheral device set 1114 (including user interface (UI) device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 4. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 1200 in persistent storage 1113.

COMMUNICATION FABRIC 1111 is the signal conduction path that allows the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, volatile memory 1112 is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface-type operating systems that employ a kernel. The code included in block 1200 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN 1102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

Definitions for certain terms that are used throughout this document are provided below:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to:

(i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:

identifying a potential collision area for multiple users, wherein each of the multiple users have respective immersive experiences;

prioritizing the multiple users' immersive experiences;

analyzing at least one ability factor associated with each of the multiple users such that an adaptation can be calculated, wherein each ability factor is selected from the group comprising: a reaction time, a mobility capability and an experience level;

calculating the adaptation needed to be made to prevent a collision, based on the prioritization; and adapting at least one of the multiple users' immersive experiences, based on the calculated adaptation, such that the collision is prevented.

2. The method of claim 1 further comprising:

monitoring a physical location for each of the multiple users; and monitoring a virtual status of each of the multiple users such that the multiple users' immersive experiences can be prioritized.

3. The method of claim 1 wherein the calculation of the adaptation further includes:

monitoring an upcoming trajectory for each of the multiple users to calculate upcoming physical locations of each of the multiple users such that the potential collision area can be identified.

4. The method of claim 1 wherein the calculation of the adaptation further includes:

analyzing virtual environments of the multiple users, to calculate overlapping physical locations of the multiple users, such that the potential collision area can be identified.

5. The method of claim 1 wherein the prioritization of the multiple users' immersive experiences is based on at least one factor related to the immersive experience selected from the group comprising: an intensity factor, a significance factor and a state factor.

6. The method of claim 1 wherein the adapting at least one of the multiple users' immersive experiences is processed by a central server that is connected to each of the multiple users' systems that provide the immersive experience.

7. The method of claim 1 wherein the adapting at least one of the multiple users' immersive experiences is processed by a system of a user of the multiple users' that provide the immersive experience for the user.

8. The method of claim 1 wherein the adapting at least one of the multiple users' immersive experiences includes changing the at least one of the multiple users' immersive experience's interaction mode.

9. The method of claim 1 wherein the adapting at least one of the multiple users' immersive experiences includes placing an object in the immersive experience.

10. The method of claim 1 wherein the adapting at least one of the multiple users' immersive experiences includes changing the at least one of the multiple users' immersive interaction's content.

11. A computer system (CS) comprising:

a processor set;

a machine readable storage device; and computer code stored on the machine readable storage device, with the computer code including instructions and data for causing the processor(s) set to perform operations comprising:

identifying a potential collision area for multiple users, wherein each of the multiple users have respective immersive experiences;

prioritizing the multiple users' immersive experiences;

analyzing at least one ability factor associated with each of the multiple users such that an adaptation can be calculated, wherein each ability factor is selected from the group comprising: a reaction time, a mobility capability and an experience level;

calculating an adaptation needed to be made to prevent a collision, based on the prioritization; and adapting at least one of the multiple users' immersive experiences, based on the calculated adaptation, such that the collision is prevented.

12. The CS of claim 11, wherein the operations further comprise:

monitoring a physical location for each of the multiple users; and monitoring a virtual status of each of the multiple users, such that the multiple users' immersive experiences can be prioritized.

13. The CS of claim 11, wherein the operations further comprise:

monitoring an upcoming trajectory for each of the multiple users, to calculate upcoming physical locations of each of the multiple users, such that the potential collision area can be identified.

14. The CS of claim 11, wherein the operations further comprise:

analyzing virtual environments of the multiple users, to calculate overlapping physical locations of the multiple users, such that the potential collision area can be identified.

15. The CS of claim 11 wherein the prioritization of the multiple users' immersive experiences includes at least one factor related to the immersive experience selected from the group comprising: an intensity factor, a significance factor and a state factor.

16. The CS of claim 11 wherein the adapting at least one of the multiple users' immersive experiences is processed by a central server that is connected to each of the multiple users' systems that provide the immersive experience.

17. The CS of claim 11 wherein the adapting at least one of the multiple users' immersive experiences is processed by the system of a user of the multiple users' that provide the immersive experience for the user.

18. The CS of claim 11 wherein the adapting at least one of the multiple users' immersive experiences includes changing the at least one of the multiple users' immersive experience's interaction mode.

* * * * *